US012682619B1

(12) United States Patent
    Go

(10) Patent No.:     US 12,682,619 B1
(45) Date of Patent:        Jul. 14, 2026

(54) METHOD FOR TRAINING CAPTION REPHRASING MODEL TO ALLOW EDGE-CASE DATA TO BE GENERATED AND LEARNING DEVICE USING THE SAME

(71) Applicant: SUPERB AI CO., LTD., Seoul (KR)

(72) Inventor: Kyeongryeol Go, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 19/351,872

(22) Filed: Oct. 7, 2025

(30) Foreign Application Priority Data

Sep. 8, 2025    (KR) ........................ 10-2025-0127580

(51) Int. Cl.
    *G06V 10/774*        (2022.01)
    *G06N 20/00*         (2019.01)
    *G06V 10/764*        (2022.01)
    *G06V 10/776*        (2022.01)

(52) U.S. Cl.
    CPC ........... *G06V 10/774* (2022.01); *G06N 20/00* (2019.01); *G06V 10/764* (2022.01); *G06V 10/776* (2022.01)

(58) Field of Classification Search
    CPC .. G06V 10/774; G06V 10/776; G06V 10/764; G06N 20/00
    See application file for complete search history.

(56) References Cited

U.S. PATENT DOCUMENTS 11,829,721 B2 * 11/2023 Niu ........................ G06N 3/0895
12,321,702 B2 *  6/2025 Mohan .................. G06F 40/279

12,481,578 B2 * 11/2025 Givant ................ G06F 11/0769
2021/0241037 A1 *  8/2021 Lisowska ............. G06N 3/0464
2022/0027672 A1 *  1/2022 Xu ......................... G06F 18/214
2024/0095514 A1 *  3/2024 Jin .......................... G06F 18/22
                         (Continued)

FOREIGN PATENT DOCUMENTS

JP        2025-127878 A      9/2025
KR   10-2024-0030368 A       3/2024
KR       10-2798148 B1       4/2025
                (Continued)

OTHER PUBLICATIONS

Zhang et al., 2022, "Fine-tuning with Multi-modal Entity Prompts for News Image Captioning" (pp. 4365-4373) (Year: 2022).*
                (Continued)

*Primary Examiner* — Manav Seth
(74) *Attorney, Agent, or Firm* — Maschoff Brennan

(57)            ABSTRACT

There is provided a method for training a caption rephrasing model to allow edge-case data to be generated. The method includes steps of: (a) in response to acquiring at least one image caption, inputting, by a learning device, the image caption to the caption rephrasing model to generate a first rephrased caption to an n-th rephrased caption; (b) inputting, by the learning device, each of the first rephrased caption to the n-th rephrased caption to an image generating model, to thereby generate a first generated image and a first pseudo-label to an n-th generated image and an n-th pseudo-label, and generating, by the learning device, a first identification loss to an n-th identification; and (c) fine-tuning, by the learning device, the caption rephrasing model through a preference learning using one of (i) a preference data set and (ii) a group normalized reward.

18 Claims, 6 Drawing Sheets

(56) References Cited

U.S. PATENT DOCUMENTS

| | | | |
|---|---|---|---|
| 2024/0249039 A1* | 7/2024 | Fu ........................... | G06F 30/20 |
| 2025/0124352 A1* | 4/2025 | Som ...................... | G06N 20/00 |

FOREIGN PATENT DOCUMENTS

| | | |
|---|---|---|
| KR | 10-2801827 B1 | 5/2025 |
| KR | 10-2025-0106545 A | 7/2025 |

OTHER PUBLICATIONS

Rehan et al., 2023, "Fine-Tuning Transformer Models Using Transfer Learning for Multilingual Threatening Text Identification" (pp. 106503-106515). (Year: 2023).*

Kim et al., 2024, "Fine-tuning CLIP Text Encoders with Two-step Paraphrasing" (pp. 2175-2184). (Year: 2024).*

Razaq et al., 2024, "Identification of paraphrased text in research articles through improved embeddings and fine-tuned BERT model" (p. 74205-74232). (Year: 2024).*

KR Office Action dated Dec. 21, 2025 in application No. 10-2025-0127580.

Cheng-Che Cheng et al., "ReST: A Reconfigurable Spatial-Temporal Graph Model for Multi-Camera Multi-Object Tracking", Aug. 25, 2023, arXiv:2308.13229v1.

Yizhou Wang et al., "MCBLT: Multi-Camera Multi-Object 3D Tracking in Long Videos", Mar. 26, 2025, arXiv:2412.00692v3.

* cited by examiner

Figure 3:
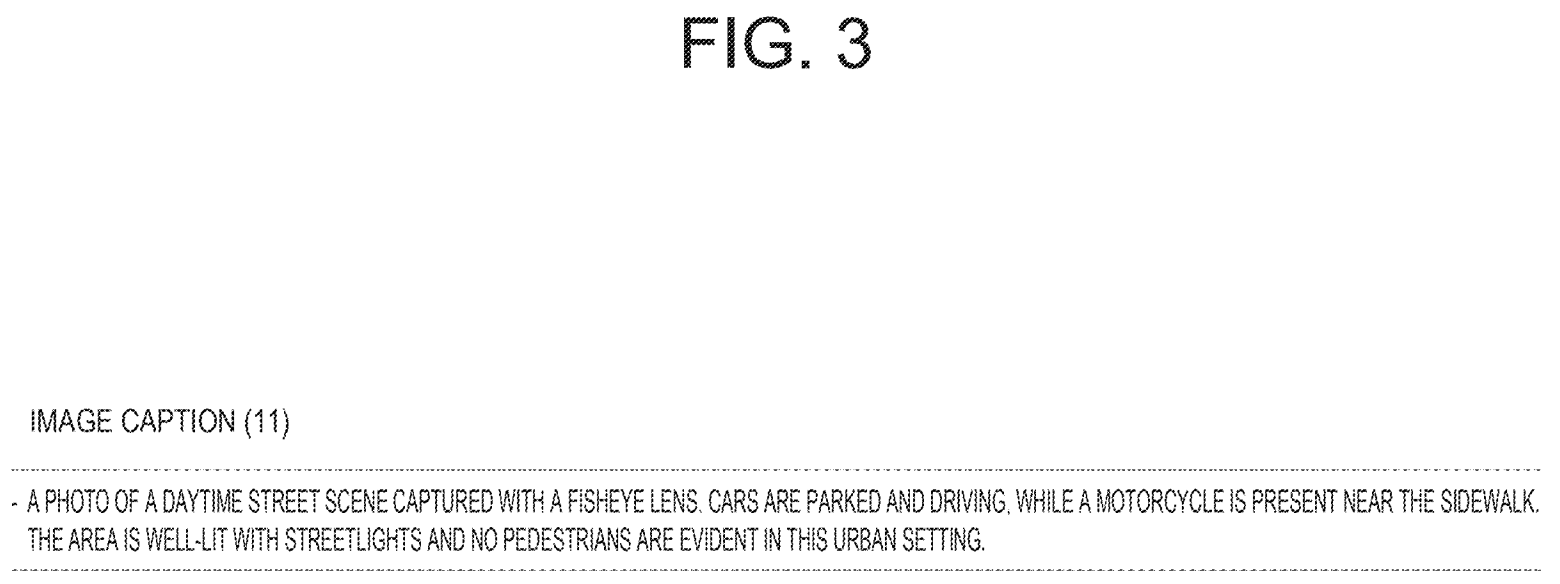

IMAGE CAPTION (11)

- A PHOTO OF A DAYTIME STREET SCENE CAPTURED WITH A FISHEYE LENS. CARS ARE PARKED AND DRIVING, WHILE A MOTORCYCLE IS PRESENT NEAR THE SIDEWALK. THE AREA IS WELL-LIT WITH STREETLIGHTS AND NO PEDESTRIANS ARE EVIDENT IN THIS URBAN SETTING.

FIG. 4

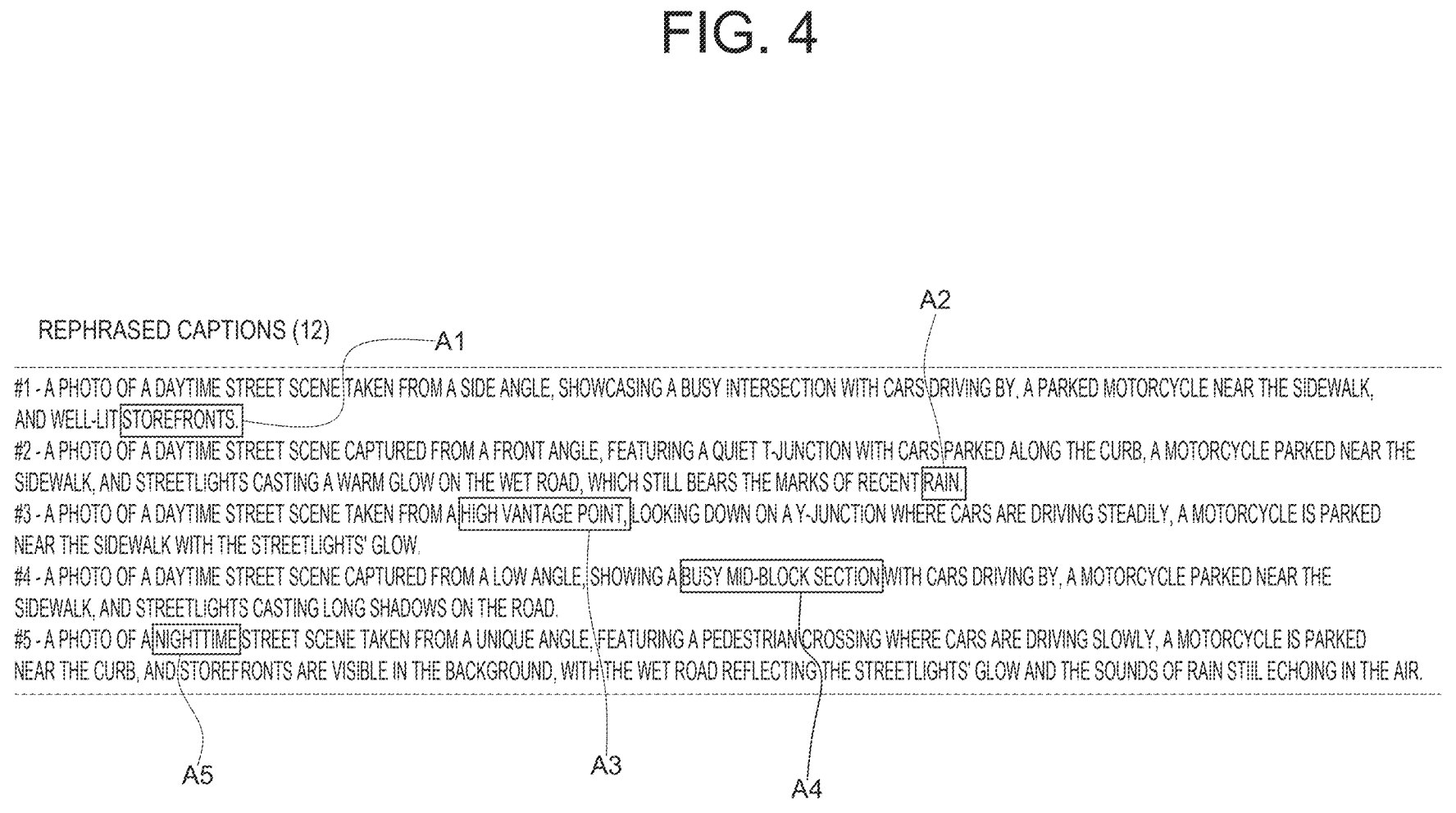

REPHRASED CAPTIONS (12)

A1

1 - A PHOTO OF A DAYTIME STREET SCENE TAKEN FROM A SIDE ANGLE, SHOWCASING A BUSY INTERSECTION WITH CARS DRIVING BY, A PARKED MOTORCYCLE NEAR THE SIDEWALK, AND WELL-LIT STOREFRONTS.

A2

2 - A PHOTO OF A DAYTIME STREET SCENE CAPTURED FROM A FRONT ANGLE, FEATURING A QUIET T-JUNCTION WITH CARS PARKED ALONG THE CURB, A MOTORCYCLE PARKED NEAR THE SIDEWALK, AND STREETLIGHTS CASTING A WARM GLOW ON THE WET ROAD, WHICH STILL BEARS THE MARKS OF RECENT RAIN.

3 - A PHOTO OF A DAYTIME STREET SCENE TAKEN FROM A HIGH VANTAGE POINT, LOOKING DOWN ON A Y-JUNCTION WHERE CARS ARE DRIVING STEADILY, A MOTORCYCLE IS PARKED NEAR THE SIDEWALK WITH THE STREETLIGHTS' GLOW.

A3

4 - A PHOTO OF A DAYTIME STREET SCENE CAPTURED FROM A LOW ANGLE, SHOWING A BUSY MID-BLOCK SECTION WITH CARS DRIVING BY, A MOTORCYCLE PARKED NEAR THE SIDEWALK, AND STREETLIGHTS CASTING LONG SHADOWS ON THE ROAD.

A4

5 - A PHOTO OF A NIGHTTIME STREET SCENE TAKEN FROM A UNIQUE ANGLE, FEATURING A PEDESTRIAN CROSSING WHERE CARS ARE DRIVING SLOWLY, A MOTORCYCLE IS PARKED NEAR THE CURB, AND STOREFRONTS ARE VISIBLE IN THE BACKGROUND, WITH THE WET ROAD REFLECTING THE STREETLIGHTS' GLOW AND THE SOUNDS OF RAIN STILL ECHOING IN THE AIR.

A5

EDGE-CASE REPHRASED CAPTION

A PHOTO OF A NIGHTTIME STREET SCENE TAKEN FROM A HIGH VANTAGE POINT, LOOKING DOWN ON A BUSY MID-BLOCK SECTION WITH CARS DRIVING BY, A MOTORCYCLE PARKED NEAR THE SIDEWALK, AND WELL-LIT STOREFRONTS CASTING A WARM GLOW ON THE WET ROAD, WHICH STILL BEARS THE MARKS OF RECENT RAIN.

B1    B2    B3    B4    B5

METHOD FOR TRAINING CAPTION REPHRASING MODEL TO ALLOW EDGE-CASE DATA TO BE GENERATED AND LEARNING DEVICE USING THE SAME

CROSS REFERENCE TO RELATED APPLICATION

This application claims the benefit of priority to Korean Patent Application No. 10-2025-0127580, filed on Sep. 8, 2025, the entire contents of which being incorporated herein by reference.

FIELD OF THE DISCLOSURE

The present disclosure relates to generating training data to be used for training AI (Artificial Intelligence) through a data generation model. More specifically, the present disclosure relates to a method for training a caption rephrasing model which rephrases an image caption inputted to the data generation model for generating edge-case data and a learning device using the same.

BACKGROUND OF THE DISCLOSURE

Machine learning based AI (artificial intelligence) models may process and analyze vast amount of data, make better decisions, and generate accurate predictions. According to technological advancements, the AI models are being utilized across diverse fields.

To train these AI models accurately, training data covering all possible scenarios are required.

However, while real-world scenarios actually occur, the training data required to train the AI models to recognize these real-world scenarios may be insufficient. Consequently, the AI models may not adequately respond to real-world situations since the AI models cannot be sufficiently trained.

Therefore, edge-case data for edge-cases which the AI models cannot adequately respond must be additionally collected to train the AI model.

Typically, to collect the edge-case data, the process of identifying the edge-cases that the AI models cannot adequately respond is required. Currently, this process is performed by humans directly determining the required additional data and collecting these data, through sophisticated data analysis based on confusion matrices, class-wise AP, false positive/negative cases, etc.

Meanwhile, generative models are utilized to create synthetic data for training the AI models. While this approach of generating the synthetic data by utilizing the generative model is useful for resolving the lack of data, this approach mainly generates data following a general distribution. Consequently, despite the need of various types of data for training, this approach has a problem of mode collapse, which is repeatedly generating similar types of data.

Thus, once the quantity of the generated data exceeds a certain threshold, the generated data fails to reflect rare scenarios such as the edge-cases, and thus the usefulness of the generated data as the training data decreases.

Further, recently, research cases of extracting text which describe an edge-case situation based on a sophisticated data analysis on the edge-case that the AI models cannot adequately respond, generating the synthetic data through a text-to-image model by using the extracted text, and thus improving an object-detection performance by using the synthetic data are reported. However, these approaches rely on manual analysis and subjective determination of experts, resulting in technical disadvantages of making the whole process difficult to automate, difficult to apply iteratively, and requiring significant time and effort.

SUMMARY OF THE DISCLOSURE

It is an object of the present disclosure to solve all the aforementioned problems.

It is another object of the present disclosure to automatically and economically generate text(s) for edge-case situations without manual analysis and text writing of high cost.

It is still another object of the present disclosure to configure a synthetic data set reflecting various and realistic edge-case situations.

It is still yet another object of the present disclosure to improve a learning efficiency of AI models using training data set according to the edge-case situations, and to improve a generalization performance to adequately respond to the edge-cases.

The characteristic configurations of the present disclosure for achieving the object of the present disclosure as described above are as follows.

In accordance with one aspect of the present disclosure, there is provided A method for training a caption rephrasing model to allow edge-case data to be generated, comprising steps of: (a) in response to acquiring at least one image caption, inputting, by a learning device, the image caption to the caption rephrasing model to thereby allow the caption rephrasing model to generate a first rephrased caption to an n-th rephrased caption, wherein n is an integer equal to or larger than 2; (b) inputting, by the learning device, each of the first rephrased caption to the n-th rephrased caption to an image generating model, to thereby allow the image generating model to generate a first generated image and a first pseudo-label corresponding to the first rephrased caption to an n-th generated image and an n-th pseudo-label corresponding to the n-th rephrased caption, and generating, by the learning device, a first identification loss of an identification model for the first generated image to an n-th identification loss of the identification model for the n-th generated image; and (c) fine-tuning, by the learning device, the caption rephrasing model through a preference learning using one of (i) a preference data set generated by referring to the first identification loss to the n-th identification loss and (ii) a group normalized reward generated by referring to the first identification loss to the n-th identification loss.

As one example, at the step of (b), the learning device inputs each of the first generated image to the n-th generated image to the identification model to thereby allow the identification model to generate a first identification result acquired from identifying the first generated image to an n-th identification result acquired from identifying the n-th generated image, and the learning device generates the first identification loss to the n-th identification loss, wherein the first identification loss is generated by referring to the first identification result and the first pseudo-label, and wherein the n-th identification loss is generated by referring to the n-th identification result and the n-th pseudo-label.

As one example, at the step of (c), the learning device performs one of (i) a sub-process of selecting a preferred rephrased caption and a non-preferred rephrased caption among the first rephrased caption to the n-th rephrased caption by referring to the first identification loss to the n-th identification loss to thereby generate the preference data set, generating a first preference loss by using at least one of the preferred rephrased caption and the non-preferred rephrased caption of the preference data set, and fine-tuning the caption rephrasing model by referring to the first preference loss and (ii) a sub-process of normalizing the first identification loss to the n-th identification loss by using an average and a standard deviation of the first identification loss to the n-th identification loss to thereby generate the group normalized reward, generating a 2_1-st preference loss corresponding to the first rephrased caption to a 2_n-th preference loss corresponding to the n-th rephrased caption by using the group normalized reward, and fine-tuning the caption rephrasing model by referring to the 2_1-st preference loss to the 2_n-th preference loss.

As one example, at the step of (c), the learning device performs fine-tuning on the caption rephrasing model through any one of (i) a full fine-tuning technique, which updates respective parameters of intermediate layers of the caption rephrasing model and (ii) a PEFT (Parameter Efficient Fine Tuning) technique, which updates parameters of at least one specific intermediate layer among intermediate layers of the caption rephrasing model.

As one example, in case the caption rephrasing model is fine-tuned through the PEFT (Parameter Efficient Fine Tuning) technique, with a low rank adaptor added in parallel to the specific intermediate layer, wherein, at the step of (a), in order for the learning device to input the image caption to the caption rephrasing model to thereby allow the caption rephrasing model to rephrase the image caption and thus to generate the first rephrased caption to the n-th rephrased caption, the learning device allows the caption rephrasing model to input a prior hidden state of a prior intermediate layer positioned at a front end of the specific intermediate layer respectively to the specific intermediate layer and the low rank adaptor, to thereby concatenate a result of applying an operation of the specific intermediate layer to the prior hidden state and a result of applying an operation of the low rank adaptor to the prior hidden state and thus generate a specific hidden state corresponding to the specific intermediate layer, and wherein, at the step of (c), in a backpropagation using preference losses according to the preference learning, the learning device only allows parameters of the low rank adaptor to be updated, and thus updates parameters of the specific intermediate layer by using the updated parameters of the low rank adaptor.

As one example, the specific intermediate layer includes a specific intermediate layer parameter matrix of d×k dimension, and the low rank adaptor includes a first low rank parameter matrix of d×r dimension and a second low rank parameter matrix of r×k dimension, wherein d and k are respective integers equal to or larger than 1, and r is an integer equal to or larger than 1 while being smaller than d and k, wherein the learning device performs inner product of the updated first low rank parameter matrix and the updated second low rank parameter matrix to thereby generate a reference parameter matrix of d×k dimension, and updates the specific intermediate layer parameter matrix by using the reference parameter matrix.

As one example, at the step of (a), the learning device inputs at least one original image to a captioning model to thereby allow the captioning model to perform captioning on the original image and thus to generate an image caption for the original image.

As one example, the original image is an image annotated with at least one ground truth label corresponding to the original image.

As one example, each of the first pseudo-label to the n-th pseudo-label includes class information and position information for at least one object in each of the first generated image to the n-th generated image.

In accordance with another aspect of the present disclosure there is provided A learning device for training a caption rephrasing model to allow edge-case data to be generated, comprising: at least one memory which saves instructions for training the caption rephrasing model to allow the edge-case data to be generated; and at least one processor configured to execute an operation for training the caption rephrasing model to allow the edge-case data to be generated according to the instructions saved in the memory to perform processes of: (I) in response to acquiring at least one image caption, inputting the image caption to the caption rephrasing model to thereby allow the caption rephrasing model to generate a first rephrased caption to an n-th rephrased caption, wherein n is an integer equal to or larger than 2; (II) inputting each of the first rephrased caption to the n-th rephrased caption to an image generating model, to thereby allow the image generating model to generate a first generated image and a first pseudo-label corresponding to the first rephrased caption to an n-th generated image and an n-th pseudo-label corresponding to the n-th rephrased caption, and generating a first identification loss of an identification model for the first generated image to an n-th identification loss of the identification model for the n-th generated image; and (III) fine-tuning the caption rephrasing model through a preference learning using one of (i) a preference data set generated by referring to the first identification loss to the n-th identification loss and (ii) a group normalized reward generated by referring to the first identification loss to the n-th identification loss.

As one example, at the process of (II), the processor inputs each of the first generated image to the n-th generated image to the identification model to thereby allow the identification model to generate a first identification result acquired from identifying the first generated image to an n-th identification result acquired from identifying the n-th generated image, and the processor generates the first identification loss to the n-th identification loss, wherein the first identification loss is generated by referring to the first identification result and the first pseudo-label, and wherein the n-th identification loss is generated by referring to the n-th identification result and the n-th pseudo-label.

As one example, at the process of (III), the processor performs one of (i) a sub-process of selecting a preferred rephrased caption and a non-preferred rephrased caption among the first rephrased caption to the n-th rephrased caption by referring to the first identification loss to the n-th identification loss to thereby generate the preference data set, generating a first preference loss by using at least one of the preferred rephrased caption and the non-preferred rephrased caption of the preference data set, and fine-tuning the caption rephrasing model by referring to the first preference loss and (ii) a sub-process of normalizing the first identification loss to the n-th identification loss by using an average and a standard deviation of the first identification loss to the n-th identification loss to thereby generate the group normalized reward, generating a 2_1-st preference loss corresponding to the first rephrased caption to a 2_n-th preference loss corresponding to the n-th rephrased caption by using the group normalized reward, and fine-tuning the caption rephrasing model by referring to the 2_1-st preference loss to the 2_n-th preference loss.

As one example, at the process of (III), the processor performs fine-tuning on the caption rephrasing model through any one of (i) a full fine-tuning technique, which updates respective parameters of intermediate layers of the caption rephrasing model and (ii) a PEFT (Parameter Efficient Fine Tuning) technique, which updates parameters of at least one specific intermediate layer among intermediate layers of the caption rephrasing model.

As one example, in case the caption rephrasing model is fine-tuned through the PEFT (Parameter Efficient Fine Tuning) technique, with a low rank adaptor added in parallel to the specific intermediate layer, wherein, at the process of (I), in order for the processor to input the image caption to the caption rephrasing model to thereby allow the caption rephrasing model to rephrase the image caption and thus to generate the first rephrased caption to the n-th rephrased caption, the processor allows the caption rephrasing model to input a prior hidden state of a prior intermediate layer positioned at a front end of the specific intermediate layer respectively to the specific intermediate layer and the low rank adaptor, to thereby concatenate a result of applying an operation of the specific intermediate layer to the prior hidden state and a result of applying an operation of the low rank adaptor to the prior hidden state and thus generate a specific hidden state corresponding to the specific intermediate layer, and wherein, at the process of (III), in a back-propagation using preference losses according to the preference learning, the processor only allows parameters of the low rank adaptor to be updated, and thus updates parameters of the specific intermediate layer by using the updated parameters of the low rank adaptor.

As one example, the specific intermediate layer includes a specific intermediate layer parameter matrix of d×k dimension, and the low rank adaptor includes a first low rank parameter matrix of d×r dimension and a second low rank parameter matrix of r×k dimension, wherein d and k are respective integers equal to or larger than 1, and r is an integer equal to or larger than 1 while being smaller than d and k, wherein the processor performs inner product of the updated first low rank parameter matrix and the updated second low rank parameter matrix to thereby generate a reference parameter matrix of d×k dimension, and updates the specific intermediate layer parameter matrix by using the reference parameter matrix.

As one example, at the process of (I), the processor inputs at least one original image to a captioning model to thereby allow the captioning model to perform captioning on the original image and thus to generate an image caption for the original image.

As one example, the original image is an image annotated with at least one ground truth label corresponding to the original image.

As one example, each of the first pseudo-label to the n-th pseudo-label includes class information and position information for at least one object in each of the first generated image to the n-th generated image.

BRIEF DESCRIPTION OF THE DRAWINGS

The accompanying drawings used to explain example embodiments of the present disclosure are only part of example embodiments of the present disclosure and other drawings may be obtained based on the drawings by those skilled in the art of the present disclosure without inventive work.

FIG. 2 is a drawing schematically illustrating a method for training the caption rephrasing model to allow the edge-case data to be generated in accordance with one example embodiment of the present disclosure.

FIGS. 3 and 4 are drawings exemplarily illustrating an image caption and its corresponding rephrased captions used in the method for training the caption rephrasing model in accordance with one example embodiment of the present disclosure.

Figure 5:
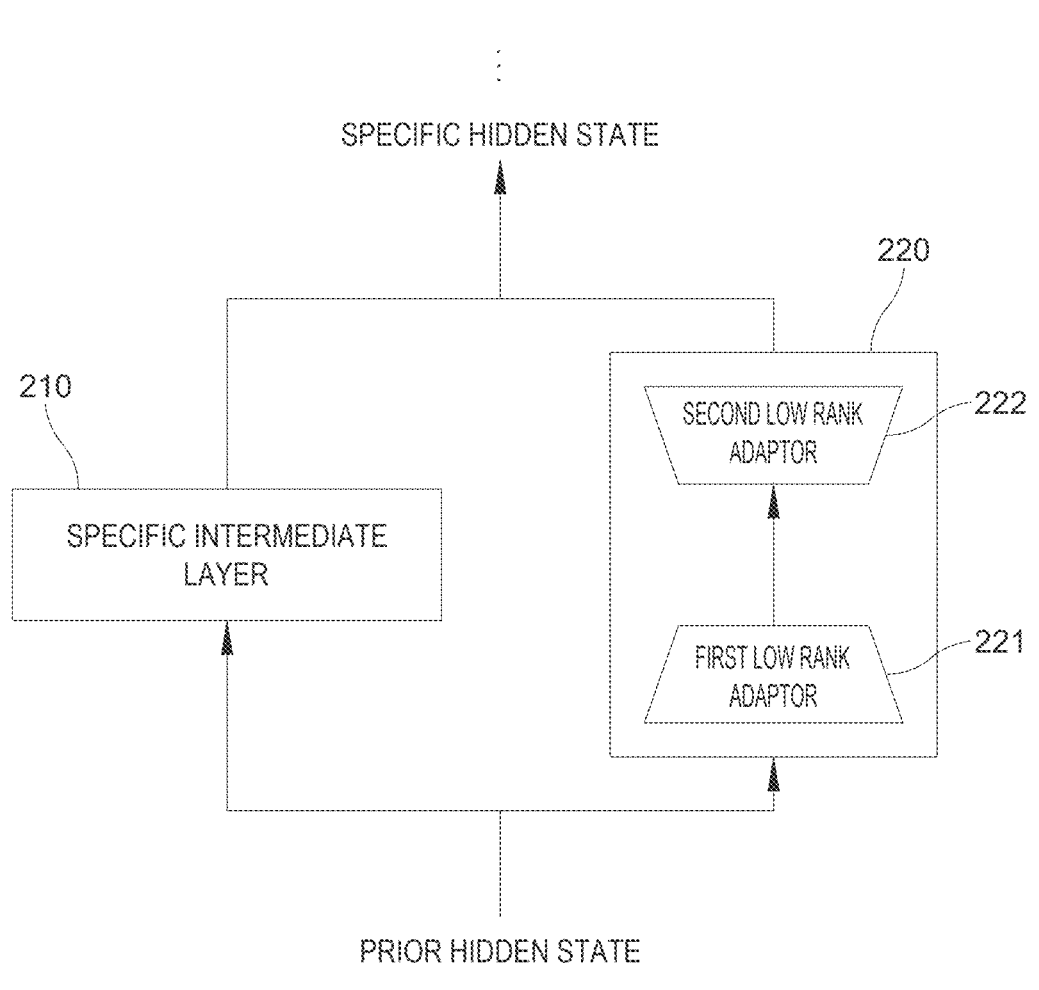

FIG. 5 is a drawing exemplarily illustrating a state of applying a row-rank adaptor to a specific intermediate layer of the caption rephrasing model in the method for training the caption rephrasing model in accordance with one example embodiment of the present disclosure.

Figure 6:
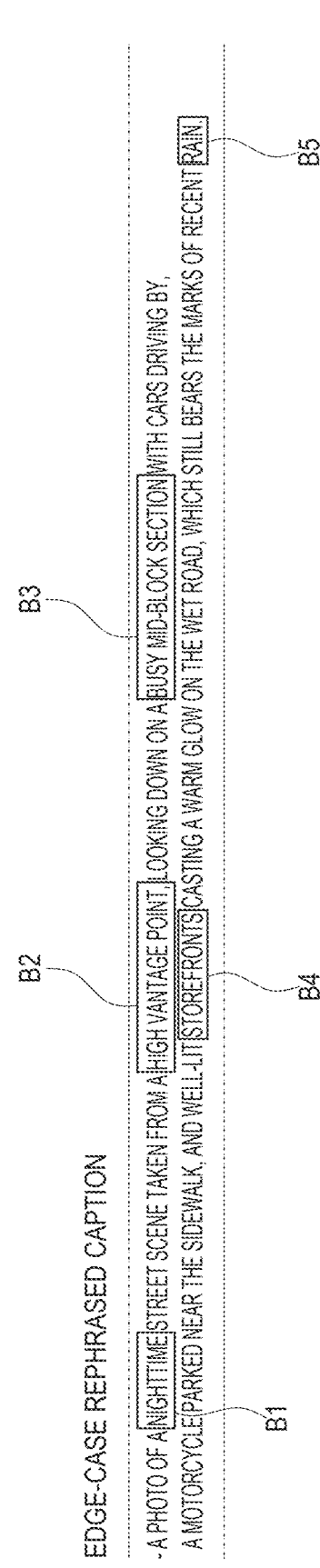

FIG. 6 is a drawing exemplarily illustrating an edge-case rephrased caption acquired from rephrasing the image caption by a trained caption rephrasing model in accordance with one example embodiment of the present disclosure.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

Figure 1:
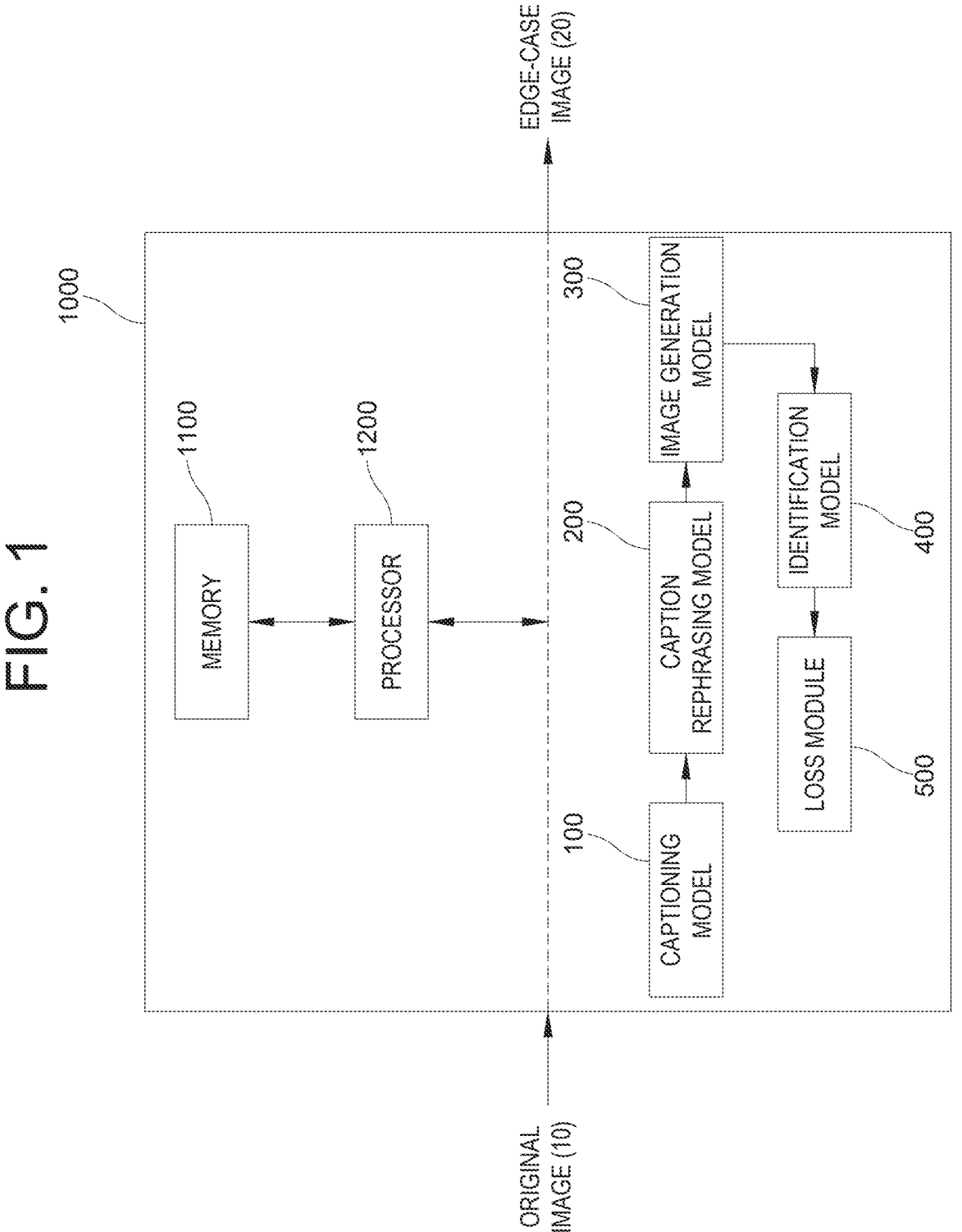
FIG. 1 is a drawing schematically illustrating a learning device for training a caption rephrasing model to allow edge-case data to be generated in accordance with one example embodiment of the present disclosure.

FIG. 1 is a drawing schematically illustrating a learning device for training a caption rephrasing model to allow edge-case data to be generated in accordance with one example embodiment of the present disclosure. By referring to FIG. 1, the learning device 1000 may include a memory 1100 and a processor 1200 for executing operations for training a caption rephrasing model to allow edge-case data to be generated according to the instructions saved in the memory 1100. Also, the learning device 1000 may further include a captioning model 100 for extracting captions from an image, a caption rephrasing model 200 for rephrasing a text(s), an image generation model 300 for obtaining generated image by converting the text to an image, an identification model 400 for performing identification on the image, and a loss module 500 for generating a loss(es) according to an identification result of the identification model 400. However, the present disclosure is not limited to these technical configurations. Furthermore, at least one of the captioning model 100, the caption rephrasing model 200, the image generation model 300, the identification model

400 and the loss module 500 may be included in a cloud environment or another computing device.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processor 1200 of the learning device 1000 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the learning device 1000 including an integrated processor which is an integrated form of the medium, the processor, and the memory for performing the present disclosure.

Meanwhile, the processor 1200 of the learning device 1000 may execute the instructions saved in the memory 1100 to perform processes of, in response to acquiring at least one image caption, inputting the image caption to the caption rephrasing model 200 to thereby allow the caption rephrasing model 200 to generate a first rephrased caption to an n-th rephrased caption, wherein n is an integer equal to or larger than 2. Then, the processor 1200 of the learning device 1000 may execute the instructions stored in the memory 1100 to perform processes of, inputting each of the first rephrased caption to the n-th rephrased caption to an image generating model 300, to thereby allow the image generating model 300 to generate a first generated image and a first pseudo-label corresponding to the first rephrased caption to an n-th generated image and an n-th pseudo-label corresponding to the n-th rephrased caption, and generating a first identification loss of an identification model 400 for the first generated image to an n-th identification loss of the identification model 400 for the n-th generated image. Thereafter, the processor 1200 of the learning device 1000 may execute the instructions stored in the memory 1100 to perform processes of, fine-tuning the caption rephrasing model 300 through a preference learning using one of (i) a preference data set generated by referring to the first identification loss to the n-th identification loss and (ii) a group normalized reward generated by referring to the first identification loss to the n-th identification loss. Herein, each of the first pseudo-label to the n-th pseudo-label may include class information and position information for at least one object in each of the first generated image to the n-th generated image. Meanwhile, the preference data set will be described later by referring to FIG. 2, etc.

Herein, the processor 1200 of the learning device 1000 may execute the instructions saved in the memory 1100 to input at least one original image 10 to the captioning model 100 to thereby allow the captioning model 100 to perform captioning on the original image 10 and thus to generate an image caption for the original image 10.

Additionally, a trained caption rephrasing model 200 may generate a rephrased caption corresponding to an edge-case using the image caption. Therefore, the image generation model 300 may generate an edge-case image 20, which is an image generated by converting the original image 10 to the edge-case with the rephrased caption corresponding to the edge-case.

Figure 2:
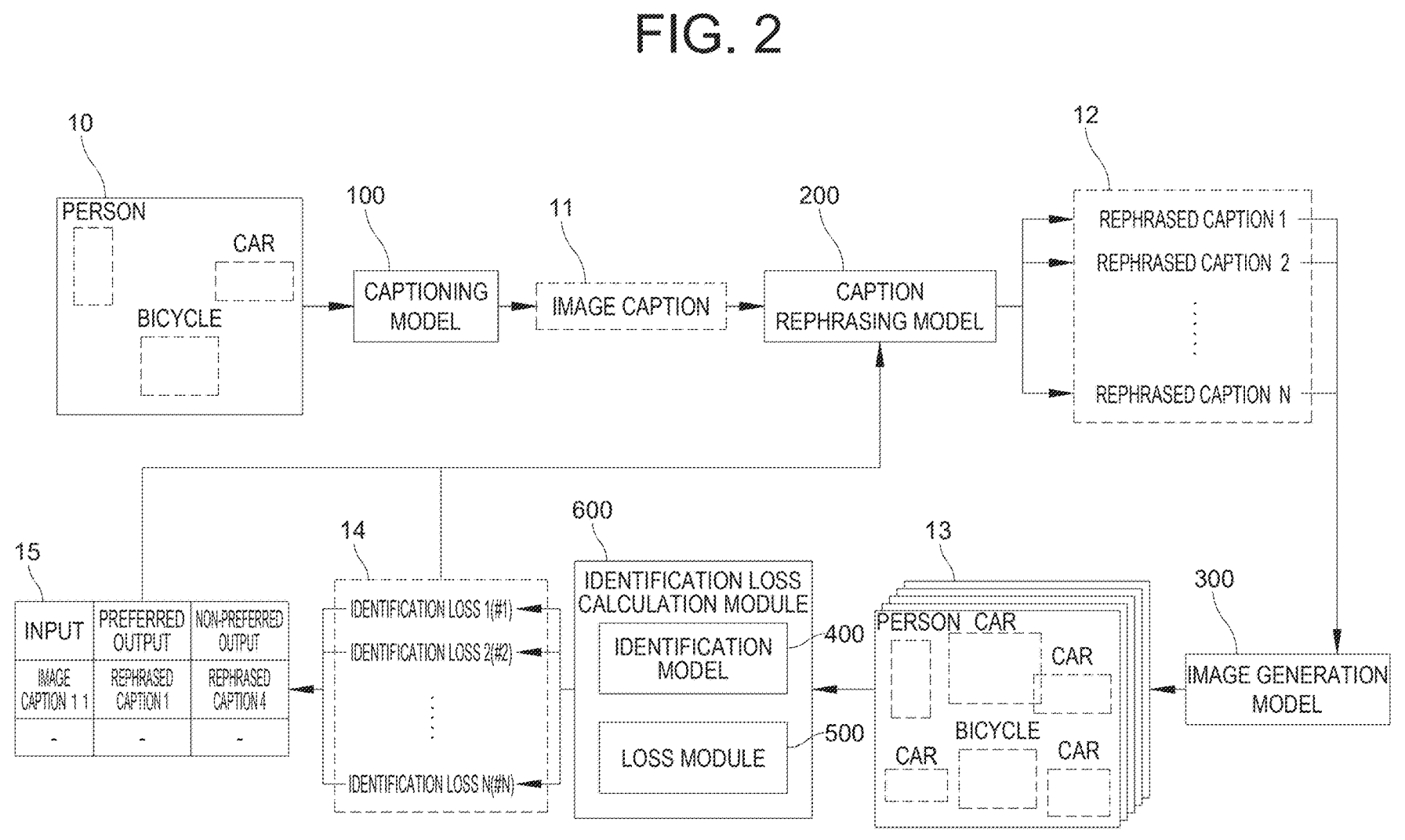

The method for training the caption rephrasing model 200 to generate edge-case data will be described in more detail by referring to FIG. 2 as follows.

First, the learning device 1000 may acquire at least one image caption 11.

Herein, the learning device 1000 may input at least one original image 10 to the captioning model 100 to thereby allow the captioning model 100 to perform captioning on the original image 10 and thus to generate an image caption 11 for the original image 10. However, the present disclosure is not limited thereto, and the image caption may be obtained by various ways, such as generating the image caption through text by a user or sampling any one of image captions from a database stored with the image captions. Also, the captioning model 100 may include models such as CLIP (Contrastive Language-Image Pre-training), BLIP (Bootstrapping Language-Image Pre-training), InternVL (large-scale vision-language foundation model), but is not limited thereto, and may include various multi-modal models performing image captioning. Additionally, the original image 10 may be an image annotated with at least one ground truth label corresponding to the original image 10.

As one example, by referring to FIG. 3, the image caption 11 may include various information such as shooting conditions of the original image, states and actions of objects included in the original image, scene characteristics of the original image, etc.

Referring back to FIG. 2 again, the learning device 1000 may input the image caption 11 to the caption rephrasing model 200 to thereby allow the caption rephrasing model 200 to generate a first rephrased caption to an n-th rephrased caption, wherein n is an integer equal to or larger than 2. Herein, the caption rephrasing model 200 may include LLM (Large Language Model).

As one example, referring to FIG. 4, the rephrased captions 12 are rephrased description of a situation for the edge-case, which the AI model is predicted to fail on giving adequate response, based on the description of a situation of the original image 100 according to the image caption 11 of FIG. 3. Herein, the description may be converted to describe situations that are difficult to collect as training data, such as texts in boxes with solid lines a1, a2, a3, a4, a5.

Referring back to FIG. 2 again, the learning device 1000 may input each of the first rephrased caption to the n-th rephrased caption 12 to the image generating model 300, to thereby allow the image generating model 300 to generate a first generated image and a first pseudo-label corresponding to the first rephrased caption to an n-th generated image and an n-th pseudo-label corresponding to the n-th rephrased caption 13. Herein, each of the first pseudo-label to the n-th pseudo-label may include class information and position information for at least one object in each of the first generated image to the n-th generated image.

Thereafter, the learning device 1000 may generate a first identification loss of an identification model 400 for the first generated image to an n-th identification loss 14 of the identification model 400 for the n-th generated image. That is, the learning device 1000 may generate the first lost to the n-th loss 14 through an identification loss calculation module 600.

As one example, the learning device 1000 may input each of the first generated image to the n-th generated image 13 to the identification model 400 to thereby allow the identification model 400 to generate a first identification result acquired from identifying the first generated image to an n-th identification result acquired from identifying the n-th generated image, and may generate the first identification loss to the n-th identification loss, wherein the first identification loss is generated by referring to the first identification result and the first pseudo-label, and wherein the n-th identification loss is generated by referring to the n-th identification result and the n-th pseudo-label. Herein, the identification model 400 may include an open-set object detector or a closed-set object detector, but the present disclosure is not limited thereto. Also, the identification model 400 may be formed as an AI model corresponding to a task of a desired model to be learned. Further, the identification model 400 may be trained to perform a task using the original image 10. Furthermore, the learning device 1000 may allow the loss module 500 to calculate identification losses.

Next, the learning device 1000 may fine-tune the caption rephrasing model 200 through a preference learning using one of (i) a preference data set 15 generated by referring to the first identification loss to the n-th identification loss 14 and (ii) a group normalized reward generated by referring to the first identification loss to the n-th identification loss 14.

Herein, in case of fine-tuning the caption rephrasing model 200 by using the preference data set, the learning device 1000 may select a preferred rephrased caption and a non-preferred rephrased caption among the first rephrased caption to the n-th rephrased caption 12 by referring to the first identification loss to the n-th identification loss 14, to thereby generate the preference data set 15. That is, the learning device 1000 may check a largest identification loss value and a smallest identification loss value among the first identification loss to the n-th identification loss 14, to thereby determine a rephrased caption used to obtain a generated image corresponding to the largest identification loss value as the preferred rephrased caption, and determine rephrased caption used to obtain the generated image corresponding to the smallest identification loss value as the non-preferred rephrased caption.

And, the learning device 1000 may generate a first preference loss by using at least one of the preferred rephrased caption and the non-preferred rephrased caption of the preference data set 15, and fine-tune the caption rephrasing model 200 by referring to the first preference loss.

Herein, the learning device 1000 may perform a preference learning on the caption rephrasing model 200 through various techniques, such as DPO (Direct Preference Optimization), IPO (Identity preference Optimization), KTO (Kahneman-Tversky Optimization), ORPO (Odds Ration Preference Optimization), and GRPO (Group Relation Policy Optimization), etc.

As an example, in case the preference learning is performed on the caption rephrasing model 200 using DPO, the caption rephrasing model 200 may be fine-tuned according to the following objective function.

$$\mathcal{L}_{DPO}(\pi_\theta; \pi_{ref}) = -\mathbb{E}_{(x, y_w, y_L)} \sim D\left[\log\sigma\left(\beta\log\frac{\pi_\theta(y_w|x)}{\pi_{ref}(y_w|x)} - \beta\log\frac{\pi_\theta(y_l|x)}{\pi_{ref}(y_l|x)}\right)\right]$$

A DPO algorithm according to the objective function above uses a pair of the preferred rephrased caption $y_w$ and the non-preferred rephrased caption $y_l$ in the preference data set 15, to thereby train the caption rephrasing model 200 which is an optimization objective model $\pi_\theta$ in directions of (i) increasing a probability value assigned to a preferred sample (i.e., the probability value assigned to the preferred rephrased caption) and (ii) decreasing a probability value assigned to a non-preferred sample (i.e., the probability value assigned to the non-preferred rephrased caption), thereby allowing the caption rephrasing model 200 to generate the rephrased caption corresponding to the edge-case by using the image caption 11.

For another example, when performing the preference learning for the caption rephrasing model 200 using the KTO technique, the caption rephrasing model 200 may be fine-tuned according to the following objective function.

$$\mathcal{L}_{KTO}(\theta) = \mathbb{E}_{(x,y)}[\mathbb{1}_{positive}(x, y) \cdot \ell_{gain}(\pi_\theta(y|x)) + \mathbb{1}_{negative}(x, y) \cdot \ell_{loss}(\pi_\theta(y|x))]$$

Different from the DPO using the pair of the preferred rephrased caption $y_w$ and the non-preferred rephrased caption in the preference data set 15, the KTO algorithm based on the above objective function trains the caption rephrasing model 200 by only using a binary feedback for each of the rephrased captions of the preference data set 15, with the preferred rephrased caption set as positive and the non-preferred rephrased caption set as negative. Herein, the caption rephrasing model 200 is trained in directions of (i) increasing the probability value when an inputted rephrased caption is positive and (ii) decreasing the probability value when the inputted rephrased caption is negative, thereby allowing the caption rephrasing model 200 to generate the rephrased caption corresponding to the edge-case by using the image caption 11.

Further, in case of fine-tuning the caption rephrasing model 200 using the group normalized reward, the learning device 1000 may normalize the first identification loss to the n-th identification loss by using an average and a standard deviation of the first identification loss to the n-th identification loss to thereby generate the group normalized reward, generate a 2_1-st preference loss corresponding to the first rephrased caption to a 2_n-th preference loss corresponding to the n-th rephrased caption by using the group normalized reward, and fine-tune the caption rephrasing model by referring to the 2_1-st preference loss to the 2_n-th preference loss.

For example, in case of performing preference learning for the caption rephrasing model 200 using the GRPO, the caption rephrasing model 200 may be fine-tuned according to the following objective function.

$$\mathcal{L}_{GRPO}(\theta) = \mathbb{E}\left[q \sim P(Q), \{Q_i\}_{i=1}^G \sim \pi_{old}(O|q)\right]$$

$$\frac{1}{G}\sum_{i=1}^G \left(\min\left(\frac{\pi_\theta(o_i|q)}{\pi_{old}(o_i|q)}A_i, \text{clip}\left(\frac{\pi_\theta(o_i|q)}{\pi_{old}(o_i|q)}, 1 - \varepsilon, 1 + \varepsilon\right)A_i\right) -$$

$$\beta\mathbb{D}_{KL}(\pi_\theta||\pi_{ref}))$$

$$\mathbb{D}_{KL}(\pi_\theta||\pi_{ref}) = \frac{\pi_{ref}(o_i|q)}{\pi_\theta(o_i|q)} - \log\frac{\pi_{ref}(o_i|q)}{\pi_\theta(o_i|q)} - 1$$

Herein, $$A_i = \frac{r_i - \text{mean}(\{r_1, r_2, \dots, r_G\})}{\text{std}(\{r_1, r_2, \dots, r_G\})}.$$

The GRPO algorithm according to the above objective function groups n rephrased captions generated for a single image caption and trains it with relative rankings. With G rephrased captions for the single image caption generated, the caption rephrasing model 200 may be trained in a way of estimating the relative reward $A_i$ using the group normalized reward $r_1, r_2, \ldots r_G$ which refers to the G identification losses, to thereby maximize the objective function using the relative reward 4;

Meanwhile, in case of fine-tuning the caption rephrasing model 200, the learning device 1000 may use any one of (i) a full fine-tuning technique, which updates respective parameters of intermediate layers of the caption rephrasing model 200 and (ii) a PEFT (Parameter Efficient Fine Tuning) technique, which updates parameters of at least one specific intermediate layer among the intermediate layers of the caption rephrasing model 200.

For example, a case of fine-tuning the caption rephrasing model 200 using the PEFT (Parameter Efficient Fine Tuning) technique is briefly described by referring to FIGS. 2 and 5 as follows.

First, with a low rank adaptor 220 added in parallel to at least one of a specific intermediate layer 210 among the intermediate layers of the caption rephrasing model 200, the learning device 1000 may input the image caption 11 to the caption rephrasing model 200 to thereby allow the caption rephrasing model 200 to rephrase the image caption 11 and thus to generate the first rephrased caption to the n-th rephrased caption 12.

Herein, the caption rephrasing model 200 may input a prior hidden state of a prior intermediate layer (not shown) positioned at a front end of the specific intermediate layer 210 respectively to the specific intermediate layer 210 and the low rank adaptor 220, to thereby concatenate a result of applying an operation of the specific intermediate layer 210 to the prior hidden state and a result of applying an operation of the low rank adaptor 220 to the prior hidden state and thus generate a specific hidden state corresponding to the specific intermediate layer 210, and allow the specific hidden state to be inputted to a back end intermediate layer (not shown) of the specific intermediate layer 210.

Also, in a backpropagation using preference losses according to the preference learning, the learning device 1000 may only allow parameters of the low rank adaptor 220 to be updated, and thus update parameters of the specific intermediate layer 210 by using the updated parameters of the low rank adaptor 220.

That is, the learning device 1000 may only update the parameters of the low rank adapter 220 while freezing the parameters of the caption rephrasing model 200 itself. Further, once training of the caption rephrasing model 200 is complete, the learning device 1000 may generate the trained caption rephrasing model 200 by updating the parameters of the specific intermediate layer 210 using the parameters of the trained low rank adapter 220. Herein, the learning device 1000 may perform inner product of the updated first low rank parameter matrix and the updated second low rank parameter matrix to thereby generate a reference parameter matrix of d×k dimension, and update the specific intermediate layer parameter matrix by using the reference parameter matrix.

As an example, the specific intermediate layer 210 may be assumed to have parameters of d×k dimension. Herein, both d and k may be integers greater than or equal to 1. Further, d may represent a hidden size of the specific intermediate layer 210, while k may be a size set according to the model and may be typically equal to d. That is, it can be assumed that the specific intermediate layer 210 may include the specific intermediate layer parameter matrix of d×k dimension.

Accordingly, the low rank adapter 220 may include a first low rank adapter 221 with parameters of d×r dimension and a second low rank adapter 222 with parameters of r×k dimension. That is, the low rank adapter 220 can be configured with the first low rank adapter 221 having the first low rank parameter matrix of d×r dimension and the second low rank adapter 222 having the second low rank parameter matrix of r×k dimension. Herein, r is a value set to convert the high rank parameters of the specific intermediate layer 210 into the low rank parameters, and r may be an integer less than both d and k but greater than or equal to 1. That is, the dimension of r may be set to a dimension lower than min (d, k) to implement low rank.

When the training is complete, the inner product of the parameters of d×r dimension of the first low rank adapter 221 and the parameters of r×k dimension of the second low rank adapter 222 is performed to generate the parameters of d×k dimension. Thereafter, the generated parameters of d×k dimension may be used to update the parameters of d×k dimension of the specific intermediate layer 210. Herein, in case of updating the parameters of the specific intermediate layer 210, a scale factor is applied to each value of the parameters generated via the low rank adapter 220 to generate scaled parameter values, to thereby update each of the corresponding values of the parameters of the specific intermediate layer 210 by using each of the scaled parameter values.

Referring back to FIG. 1 again, once the caption rephrasing model 200 is trained to generate edge-case rephrased captions in this manner, when the image caption for the original image 10 generated through the captioning model 100 is inputted, the caption rephrasing model 200 may perform rephrasing on the image caption to generate a rephrased caption. For reference, while FIG. 1 shows the learning device 1000, once the caption rephrasing model 200 is trained, the captioning model 100, the caption rephrasing model 200 and the image generation model 300 may be configured as a training data generation model, which can be used to generate edge-case images for original images.

For example, by referring to FIG. 6, the image caption which is an original situation description for the original image in FIG. 3, may be rephrased into an edge-case rephrased caption corresponding to the edge-case in the identification model. For reference, the texts in the boxes with solid lines b1, b2, b3, b4, b5 in FIG. 6 may be conditions added to convert the image caption in FIG. 3 closer to the edge-case.

Subsequently, the edge-case rephrased caption may be inputted to the image generation model 300. Accordingly, the image generation model 300 may generate an edge-case image 20 by using the edge-case rephrased caption.

The present disclosure has an effect of automatically and economically text(s) for edge-case situations without manual analysis and text writing of high cost.

The present disclosure has another effect of configuring the synthetic data set reflecting various and the realistic edge-case situations.

The present disclosure has still another effect of improving the learning efficiency of the AI models using the training data set according to the edge-case situations, and improving the generalization performance to adequately respond to the edge-cases.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter, etc., which is executed by a computer. The aforementioned hardware device may work as more than a software module to perform the action of the present invention and they may do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for training a caption rephrasing model to allow edge-case data to be generated, comprising steps of:
   (a) in response to acquiring at least one image caption, inputting, by a learning device, the image caption to the caption rephrasing model to thereby allow the caption rephrasing model to generate a first rephrased caption to an n-th rephrased caption, wherein n is an integer equal to or larger than 2;
   (b) inputting, by the learning device, each of the first rephrased caption to the n-th rephrased caption to an image generating model, to thereby allow the image generating model to generate a first generated image and a first pseudo-label corresponding to the first rephrased caption to an n-th generated image and an n-th pseudo-label corresponding to the n-th rephrased caption, and generating, by the learning device, a first identification loss of an identification model for the first generated image to an n-th identification loss of the identification model for the n-th generated image; and
   (c) fine-tuning, by the learning device, the caption rephrasing model through a preference learning using one of (i) a preference data set generated by referring to the first identification loss to the n-th identification loss and (ii) a group normalized reward generated by referring to the first identification loss to the n-th identification loss.

2. The method of claim 1, wherein, at the step of (b), the learning device inputs each of the first generated image to the n-th generated image to the identification model to thereby allow the identification model to generate a first identification result acquired from identifying the first generated image to an n-th identification result acquired from identifying the n-th generated image, and the learning device generates the first identification loss to the n-th identification loss, wherein the first identification loss is generated by referring to the first identification result and the first pseudo-label, and wherein the n-th identification loss is generated by referring to the n-th identification result and the n-th pseudo-label.

3. The method of claim 1, wherein, at the step of (c), the learning device performs one of (i) a sub-process of selecting a preferred rephrased caption and a non-preferred rephrased caption among the first rephrased caption to the n-th rephrased caption by referring to the first identification loss to the n-th identification loss to thereby generate the preference data set, generating a first preference loss by using at least one of the preferred rephrased caption and the non-preferred rephrased caption of the preference data set, and fine-tuning the caption rephrasing model by referring to the first preference loss and (ii) a sub-process of normalizing the first identification loss to the n-th identification loss by using an average and a standard deviation of the first identification loss to the n-th identification loss to thereby generate the group normalized reward, generating a 2_1-st preference loss corresponding to the first rephrased caption to a 2_n-th preference loss corresponding to the n-th rephrased caption by using the group normalized reward, and fine-tuning the caption rephrasing model by referring to the 2_1-st preference loss to the 2_n-th preference loss.

4. The method of claim 1, wherein, at the step of (c), the learning device performs fine-tuning on the caption rephrasing model through any one of (i) a full fine-tuning technique, which updates respective parameters of intermediate layers of the caption rephrasing model and (ii) a PEFT (Parameter Efficient Fine Tuning) technique, which updates parameters of at least one specific intermediate layer among intermediate layers of the caption rephrasing model.

5. The method of claim 4, wherein, in case the caption rephrasing model is fine-tuned through the PEFT (Parameter Efficient Fine Tuning) technique, with a low rank adaptor added in parallel to the specific intermediate layer,
   wherein, at the step of (a), in order for the learning device to input the image caption to the caption rephrasing model to thereby allow the caption rephrasing model to rephrase the image caption and thus to generate the first rephrased caption to the n-th rephrased caption, the learning device allows the caption rephrasing model to input a prior hidden state of a prior intermediate layer positioned at a front end of the specific intermediate layer respectively to the specific intermediate layer and the low rank adaptor, to thereby concatenate a result of applying an operation of the specific intermediate layer to the prior hidden state and a result of applying an operation of the low rank adaptor to the prior hidden state and thus generate a specific hidden state corresponding to the specific intermediate layer, and
   wherein, at the step of (c), in a backpropagation using preference losses according to the preference learning, the learning device only allows parameters of the low rank adaptor to be updated, and thus updates parameters of the specific intermediate layer by using the updated parameters of the low rank adaptor.

6. The method of claim 5, wherein the specific intermediate layer includes a specific intermediate layer parameter matrix of d×k dimension, and the low rank adaptor includes a first low rank parameter matrix of d×r dimension and a second low rank parameter matrix of r×k dimension, wherein d and k are respective integers equal to or larger than 1, and r is an integer equal to or larger than 1 while being smaller than d and k,
   wherein the learning device performs inner product of the updated first low rank parameter matrix and the updated second low rank parameter matrix to thereby generate a reference parameter matrix of d×k dimension, and updates the specific intermediate layer parameter matrix by using the reference parameter matrix.

7. The method of claim 1, wherein, at the step of (a), the learning device inputs at least one original image to a captioning model to thereby allow the captioning model to perform captioning on the original image and thus to generate an image caption for the original image.

8. The method of claim 7, wherein the original image is an image annotated with at least one ground truth label corresponding to the original image.

9. The method of claim 1, wherein each of the first pseudo-label to the n-th pseudo-label includes class information and position information for at least one object in each of the first generated image to the n-th generated image.

10. A learning device for training a caption rephrasing model to allow edge-case data to be generated, comprising:

at least one memory which saves instructions for training the caption rephrasing model to allow the edge-case data to be generated; and at least one processor configured to execute an operation for training the caption rephrasing model to allow the edge-case data to be generated according to the instructions saved in the memory to perform processes of: (I) in response to acquiring at least one image caption, inputting the image caption to the caption rephrasing model to thereby allow the caption rephrasing model to generate a first rephrased caption to an n-th rephrased caption, wherein n is an integer equal to or larger than 2; (II) inputting each of the first rephrased caption to the n-th rephrased caption to an image generating model, to thereby allow the image generating model to generate a first generated image and a first pseudo-label corresponding to the first rephrased caption to an n-th generated image and an n-th pseudo-label corresponding to the n-th rephrased caption, and generating a first identification loss of an identification model for the first generated image to an n-th identification loss of the identification model for the n-th generated image; and (III) fine-tuning the caption rephrasing model through a preference learning using one of (i) a preference data set generated by referring to the first identification loss to the n-th identification loss and (ii) a group normalized reward generated by referring to the first identification loss to the n-th identification loss.

11. The learning device of claim 10, wherein, at the process of (II), the processor inputs each of the first generated image to the n-th generated image to the identification model to thereby allow the identification model to generate a first identification result acquired from identifying the first generated image to an n-th identification result acquired from identifying the n-th generated image, and the processor generates the first identification loss to the n-th identification loss, wherein the first identification loss is generated by referring to the first identification result and the first pseudo-label, and wherein the n-th identification loss is generated by referring to the n-th identification result and the n-th pseudo-label.

12. The learning device of claim 10, wherein, at the process of (III), the processor performs one of (i) a sub-process of selecting a preferred rephrased caption and a non-preferred rephrased caption among the first rephrased caption to the n-th rephrased caption by referring to the first identification loss to the n-th identification loss to thereby generate the preference data set, generating a first preference loss by using at least one of the preferred rephrased caption and the non-preferred rephrased caption of the preference data set, and fine-tuning the caption rephrasing model by referring to the first preference loss and (ii) a sub-process of normalizing the first identification loss to the n-th identification loss by using an average and a standard deviation of the first identification loss to the n-th identification loss to thereby generate the group normalized reward, generating a 2_1-st preference loss corresponding to the first rephrased caption to a 2_n-th preference loss corresponding to the n-th rephrased caption by using the group normalized reward, and fine-tuning the caption rephrasing model by referring to the 2_1-st preference loss to the 2_n-th preference loss.

13. The learning device of claim 10, wherein, at the process of (III), the processor performs fine-tuning on the caption rephrasing model through any one of (i) a full fine-tuning technique, which updates respective parameters of intermediate layers of the caption rephrasing model and (ii) a PEFT (Parameter Efficient Fine Tuning) technique, which updates parameters of at least one specific intermediate layer among intermediate layers of the caption rephrasing model.

14. The learning device of claim 13, wherein, in case the caption rephrasing model is fine-tuned through the PEFT (Parameter Efficient Fine Tuning) technique, with a low rank adaptor added in parallel to the specific intermediate layer, wherein, at the process of (I), in order for the processor to input the image caption to the caption rephrasing model to thereby allow the caption rephrasing model to rephrase the image caption and thus to generate the first rephrased caption to the n-th rephrased caption, the processor allows the caption rephrasing model to input a prior hidden state of a prior intermediate layer positioned at a front end of the specific intermediate layer respectively to the specific intermediate layer and the low rank adaptor, to thereby concatenate a result of applying an operation of the specific intermediate layer to the prior hidden state and a result of applying an operation of the low rank adaptor to the prior hidden state and thus generate a specific hidden state corresponding to the specific intermediate layer, and wherein, at the process of (III), in a backpropagation using preference losses according to the preference learning, the processor only allows parameters of the low rank adaptor to be updated, and thus updates parameters of the specific intermediate layer by using the updated parameters of the low rank adaptor.

15. The learning device of claim 14, wherein the specific intermediate layer includes a specific intermediate layer parameter matrix of d×k dimension, and the low rank adaptor includes a first low rank parameter matrix of d×r dimension and a second low rank parameter matrix of r×k dimension, wherein d and k are respective integers equal to or larger than 1, and r is an integer equal to or larger than 1 while being smaller than d and k, wherein the processor performs inner product of the updated first low rank parameter matrix and the updated second low rank parameter matrix to thereby generate a reference parameter matrix of d×k dimension, and updates the specific intermediate layer parameter matrix by using the reference parameter matrix.

16. The learning device of claim 10, wherein, at the process of (I), the processor inputs at least one original image to a captioning model to thereby allow the captioning model to perform captioning on the original image and thus to generate an image caption for the original image.

17. The learning device of claim 16, wherein the original image is an image annotated with at least one ground truth label corresponding to the original image.

18. The learning device of claim 10, wherein each of the first pseudo-label to the n-th pseudo-label includes class information and position information for at least one object in each of the first generated image to the n-th generated image.

* * * * *